United States Patent
Iwamoto

(10) Patent No.: US 8,854,747 B2
(45) Date of Patent: Oct. 7, 2014

(54) OPTICAL SYSTEM AND IMAGE PICKUP APPARATUS INCLUDING THE SAME

(71) Applicant: Canon Kabushiki Kaisha, Tokyo (JP)

(72) Inventor: Shunji Iwamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/793,092

(22) Filed: Mar. 11, 2013

(65) Prior Publication Data

US 2013/0242414 A1   Sep. 19, 2013

(30) Foreign Application Priority Data

Mar. 15, 2012   (JP) ................. 2012-058491

(51) Int. Cl.
*G02B 9/64* (2006.01)
*G02B 9/62* (2006.01)
*G02B 13/04* (2006.01)
*G02B 13/22* (2006.01)

(52) U.S. Cl.
CPC *G02B 9/64* (2013.01); *G02B 13/04* (2013.01); *G02B 13/22* (2013.01); *G02B 9/62* (2013.01)
USPC ......................................... 359/755; 359/756

(58) Field of Classification Search
CPC ......... G02B 9/62; G02B 6/64; G02B 13/0045
USPC .......................................... 359/755, 756, 761
See application file for complete search history.

(56) References Cited

U.S. PATENT DOCUMENTS

| | | | |
|---|---|---|---|
| 4,806,001 A * | 2/1989 | Okabe et al. | 359/708 |
| 7,440,196 B2 | 10/2008 | Kobayashi | |
| 7,940,478 B2 | 5/2011 | Take | |
| 2012/0212838 A1* | 8/2012 | Ohashi | 359/713 |
| 2013/0141801 A1* | 6/2013 | Yun et al. | 359/716 |

* cited by examiner

*Primary Examiner* — Darryl J Collins

(74) *Attorney, Agent, or Firm* — Canon USA Inc IP Division

(57) ABSTRACT

An optical system includes a first lens unit, an aperture stop, and a second lens unit having a positive refractive power. The first lens unit includes a first lens having a negative refractive power and a second lens having a positive refractive power. The second lens unit includes a cemented lens, a fifth lens having a negative refractive power and a concave surface facing an object side, and a sixth lens having a positive refractive power and a convex surface facing an image side. In the cemented lens, a third lens having a positive refractive power and a fourth lens having a negative refractive power are cemented. A distance D1 from an object-side lens surface vertex of the first lens to the aperture stop and a distance Dt from the object-side lens surface vertex of the first lens to an image plane are appropriately set.

11 Claims, 16 Drawing Sheets

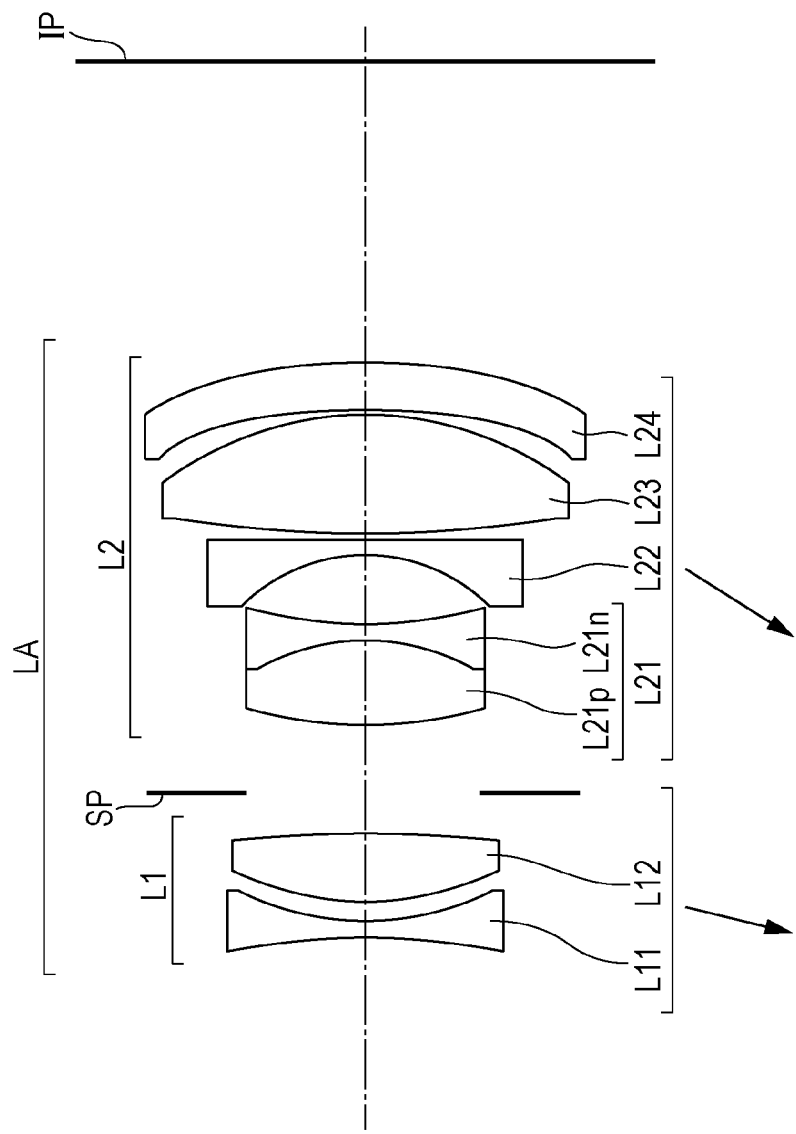

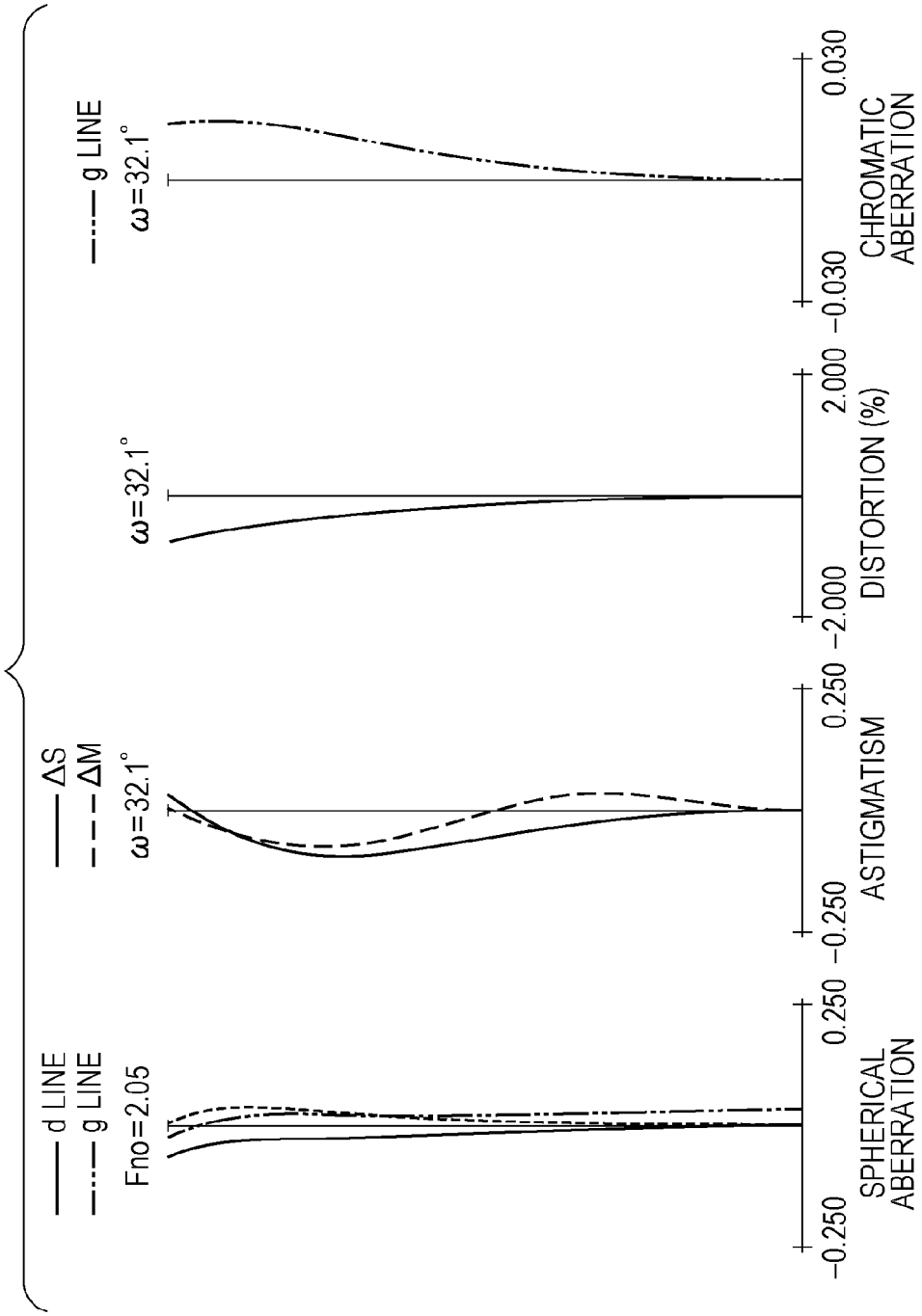

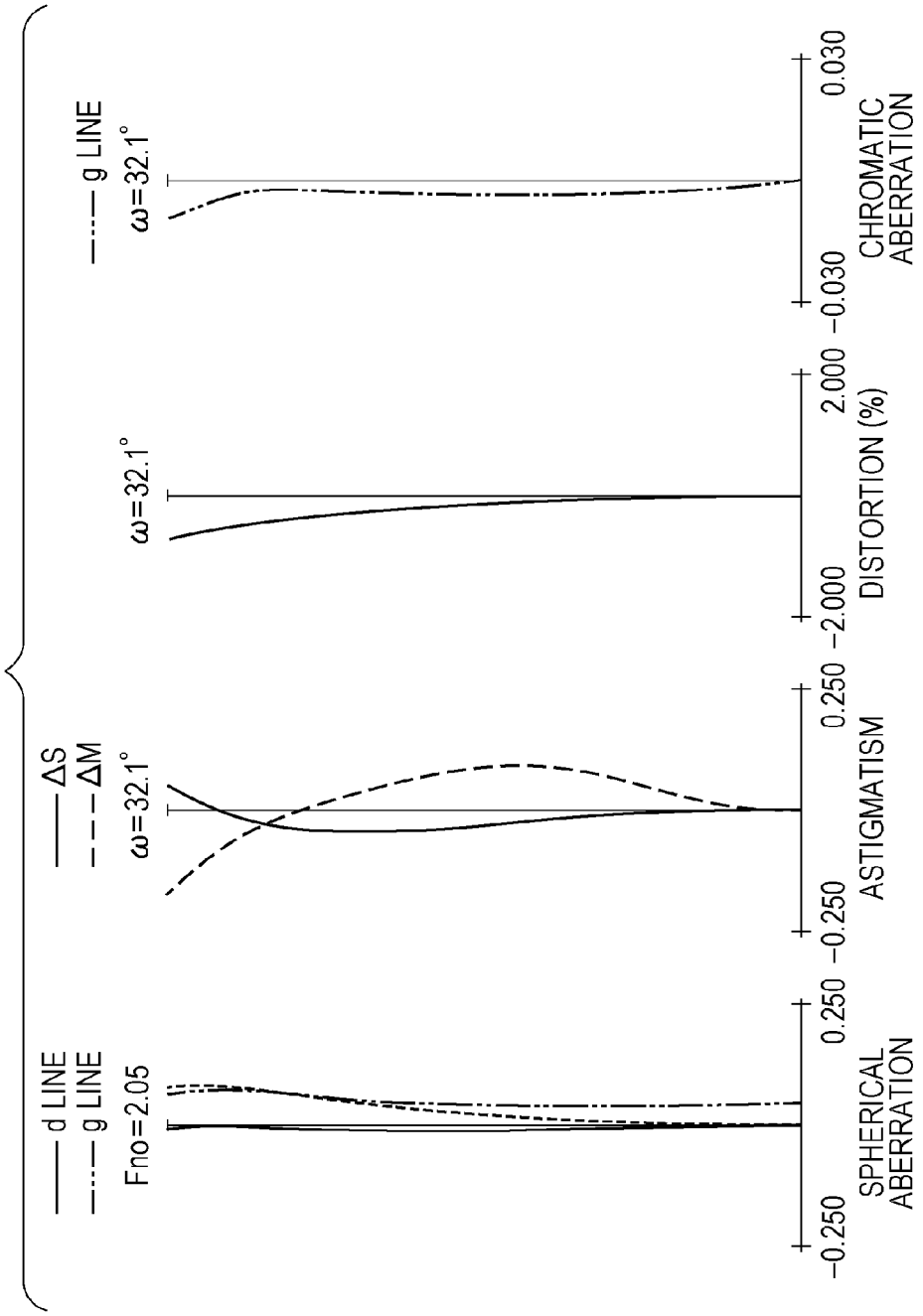

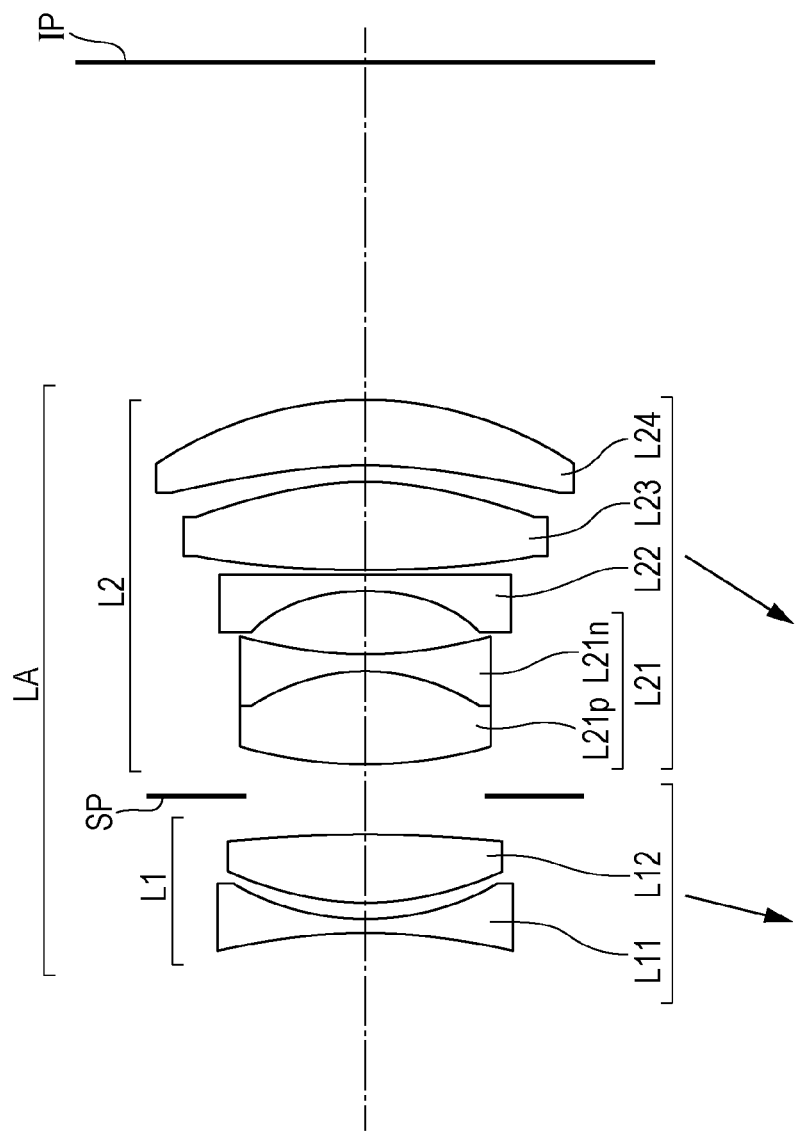

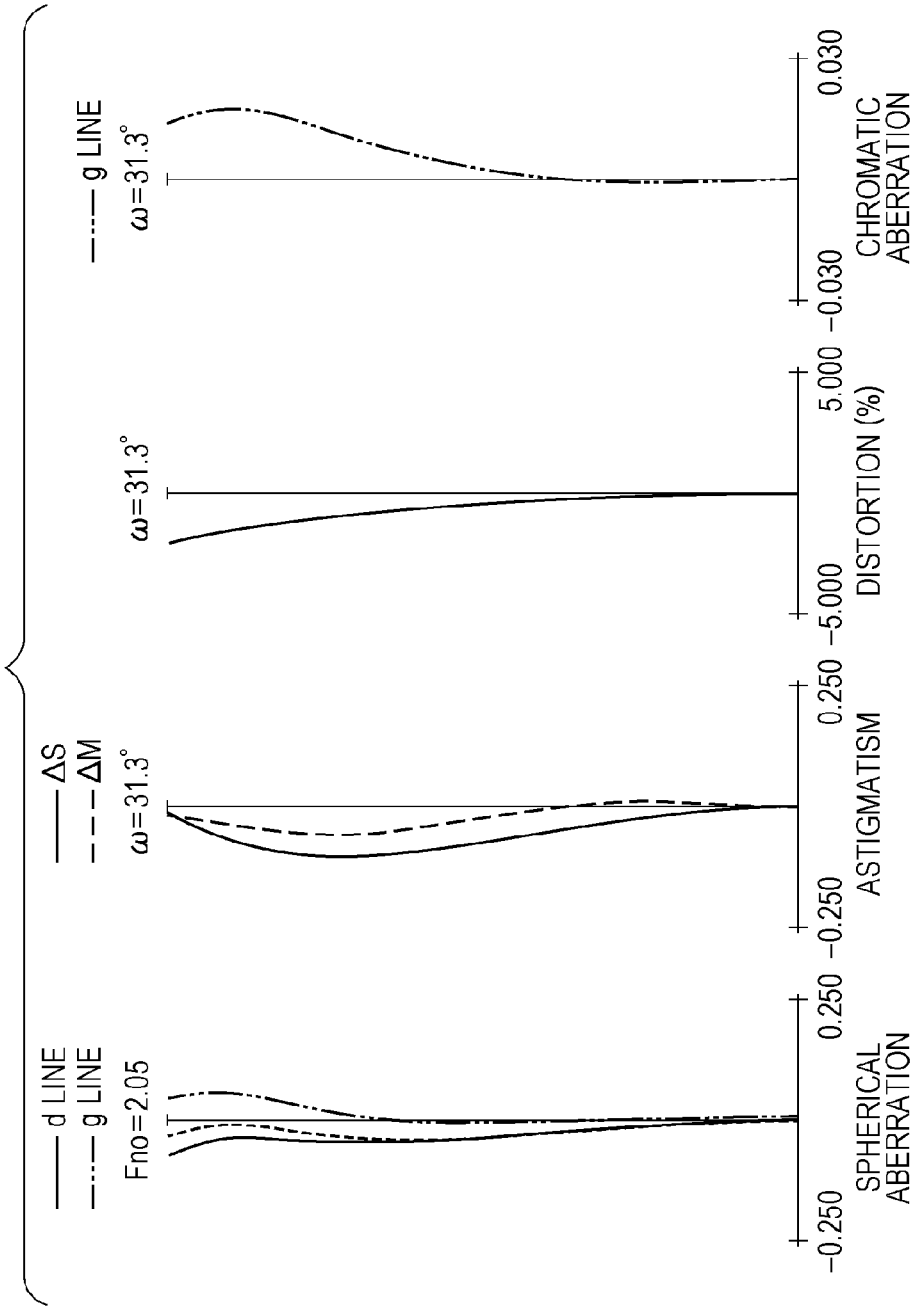

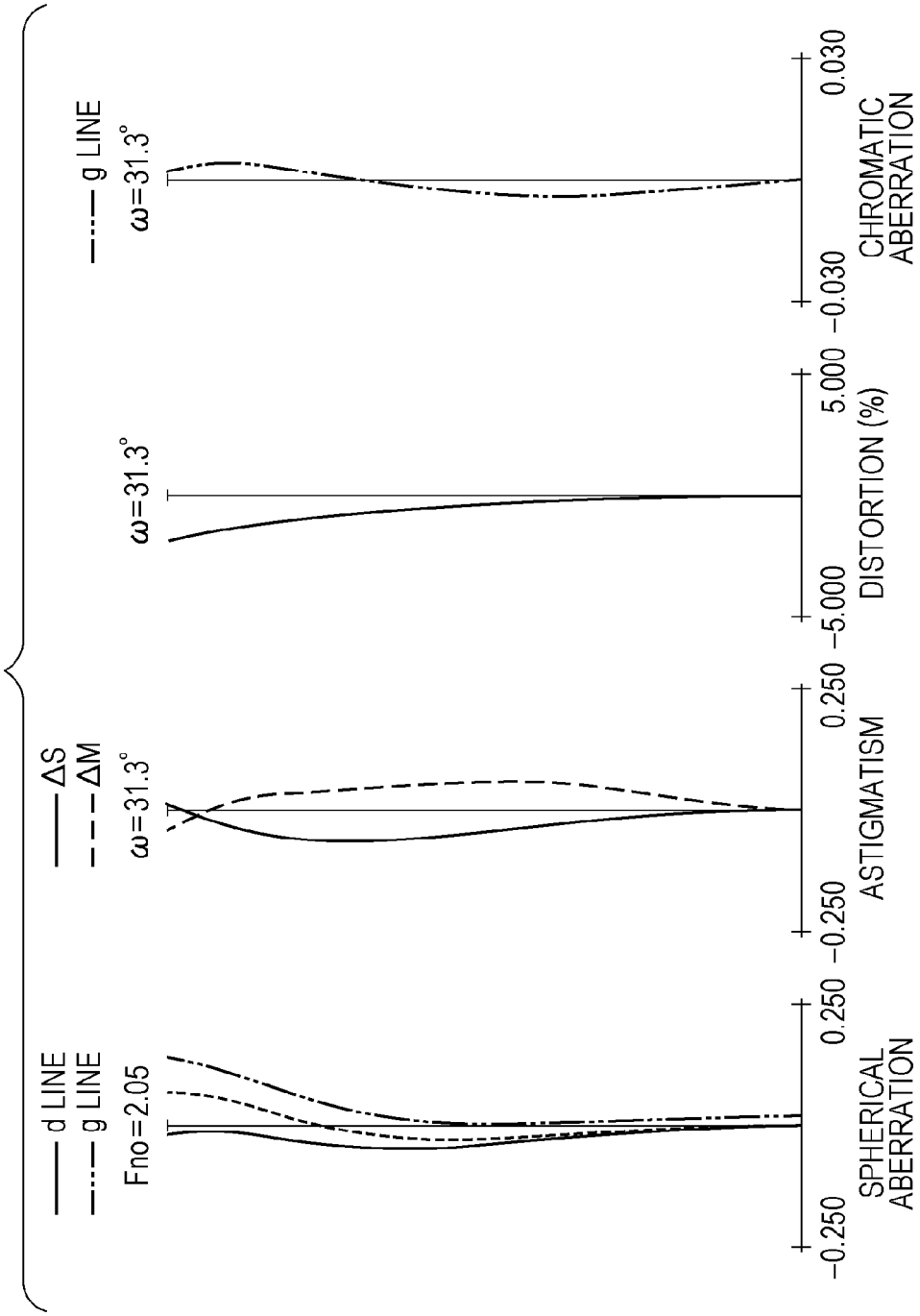

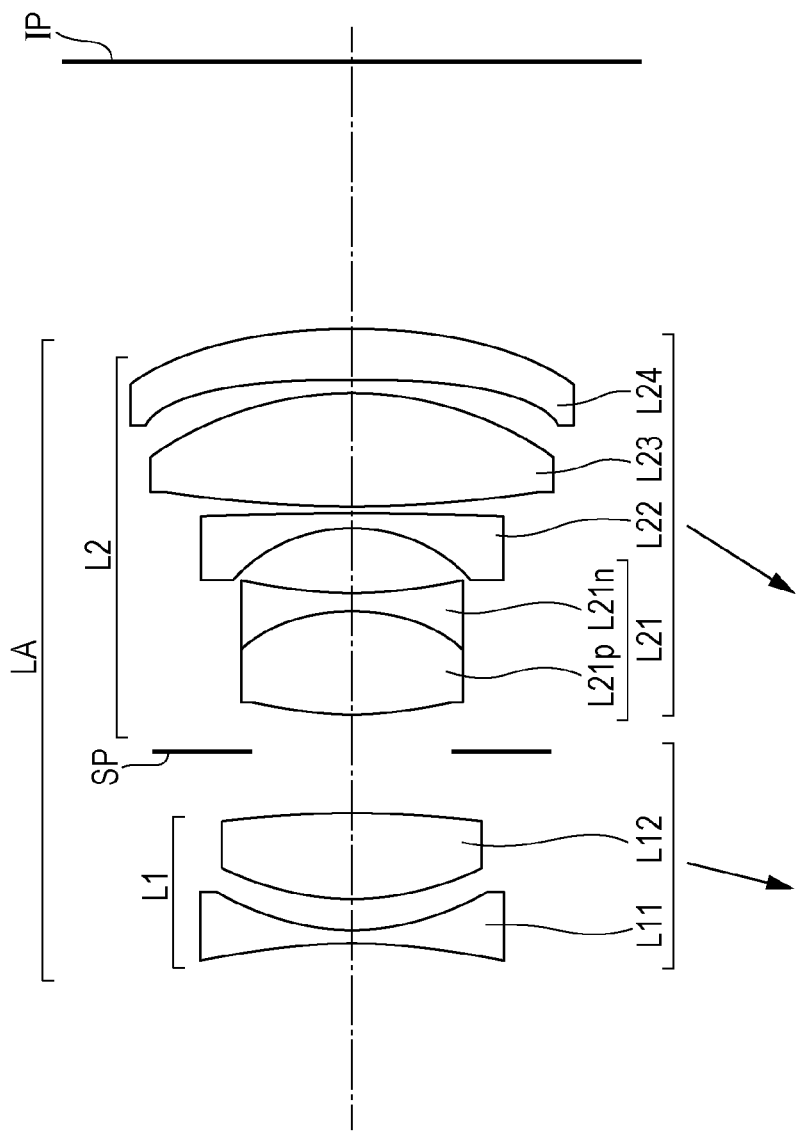

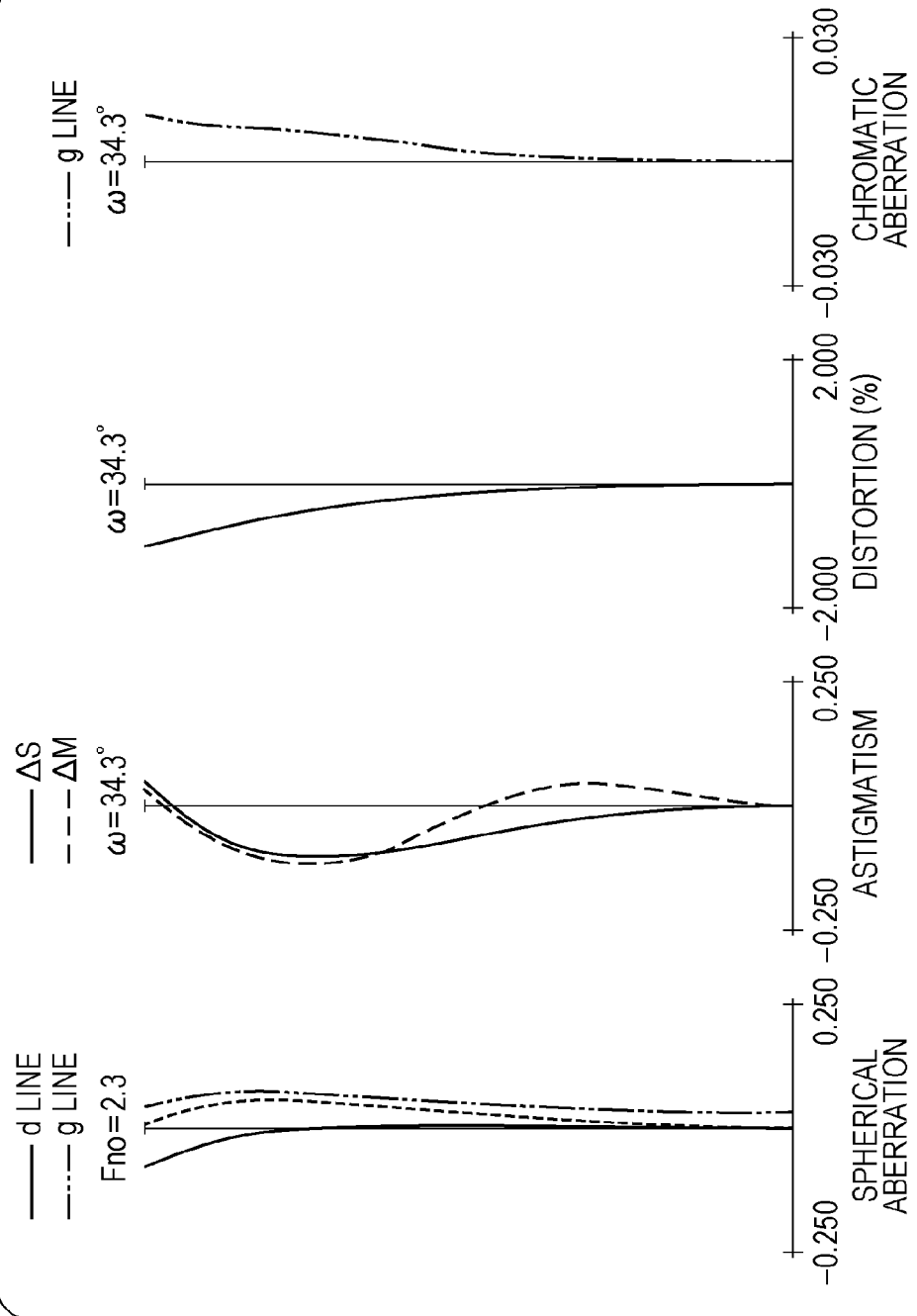

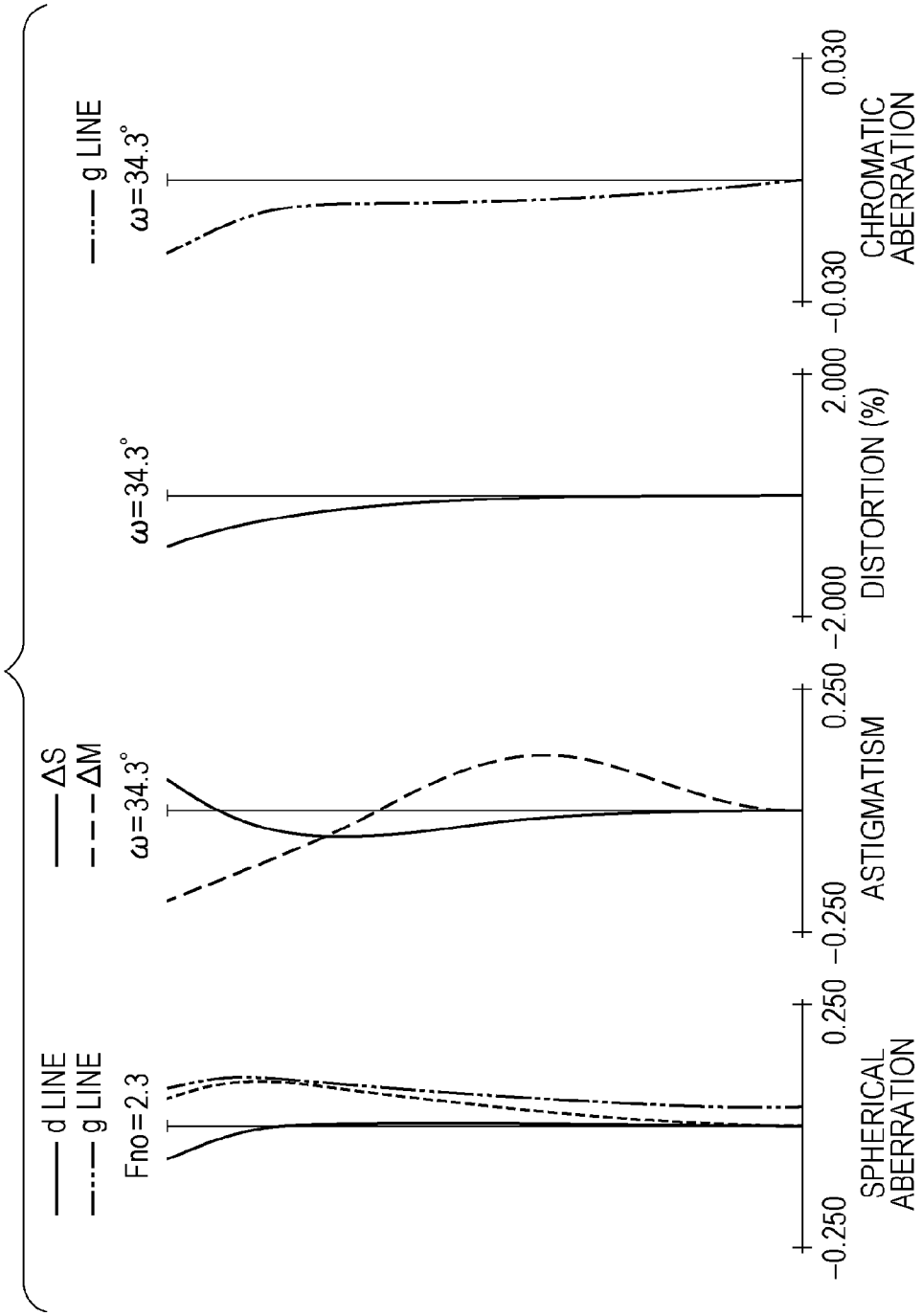

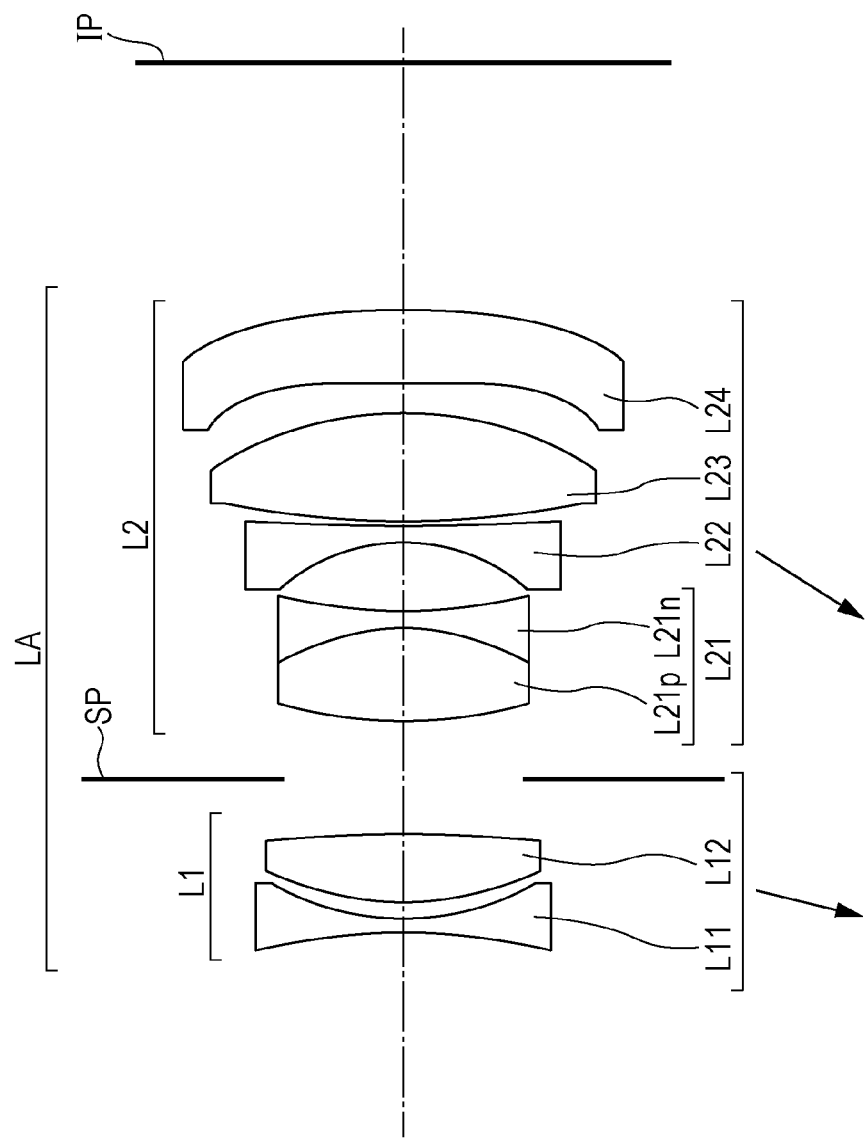

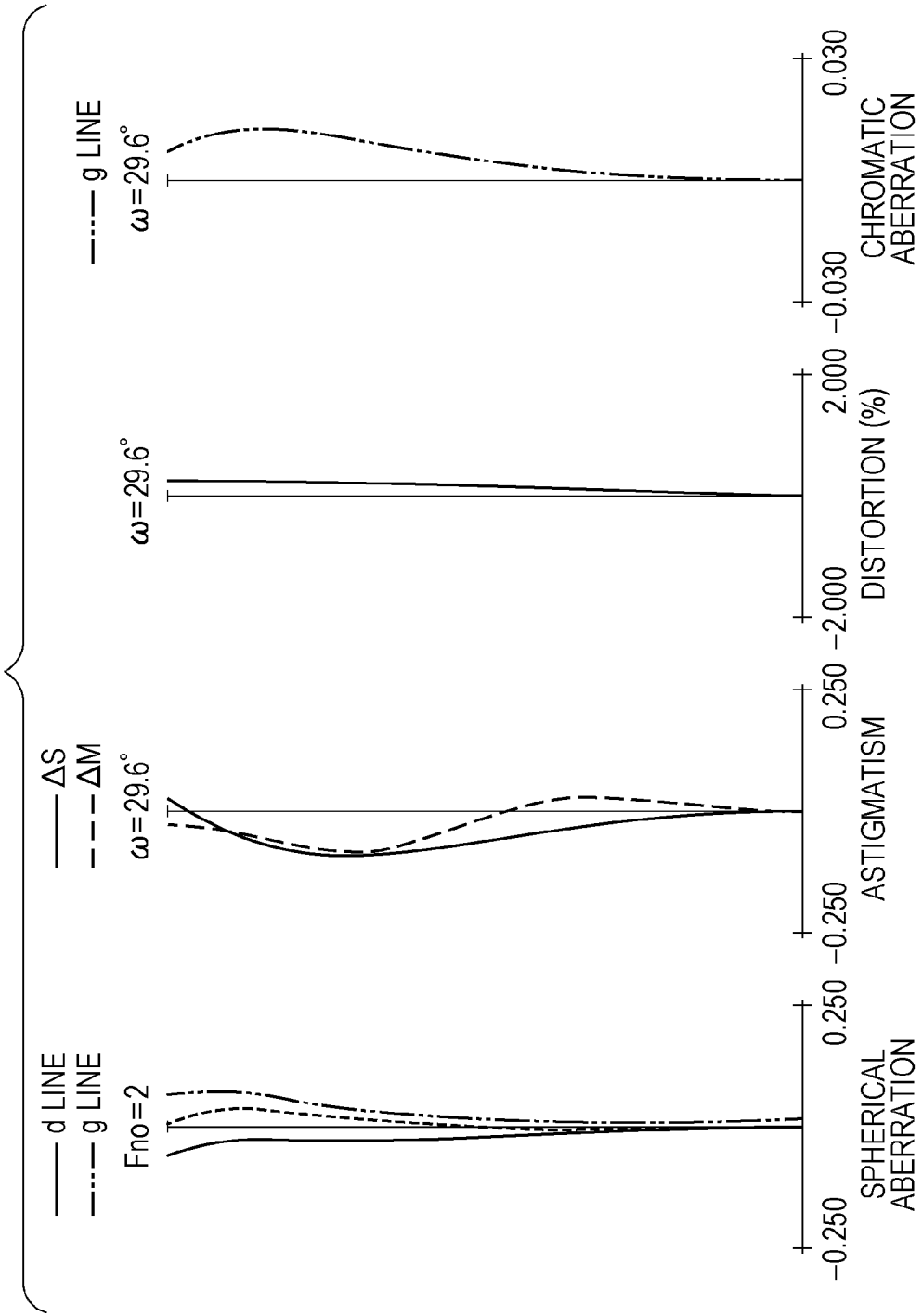

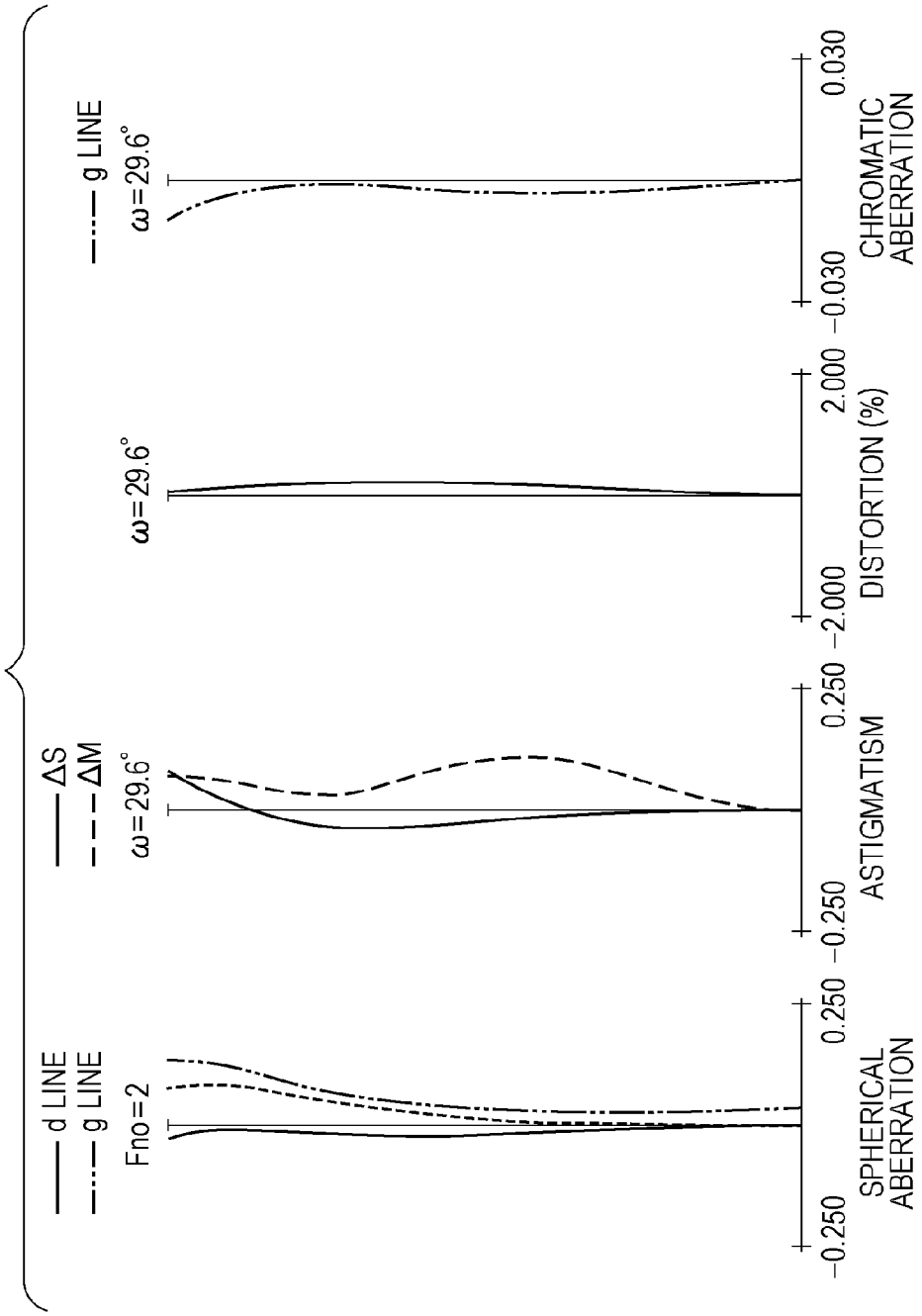

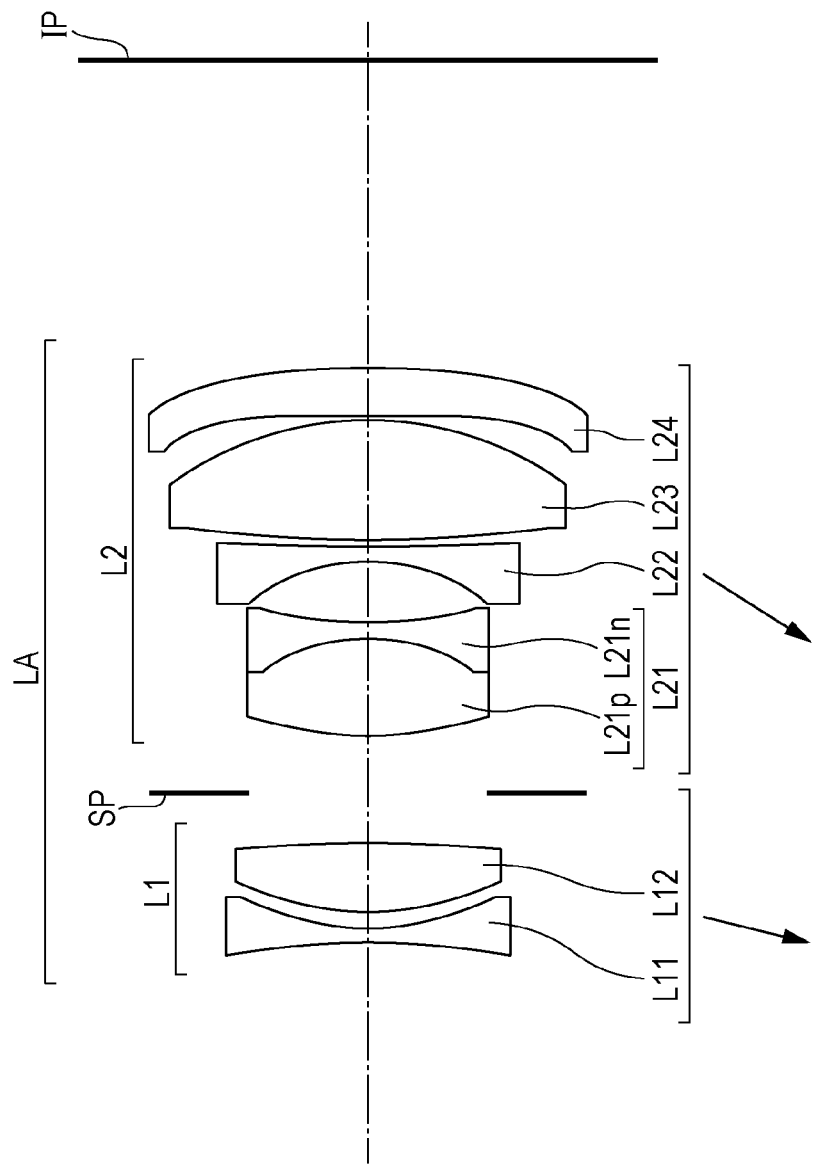

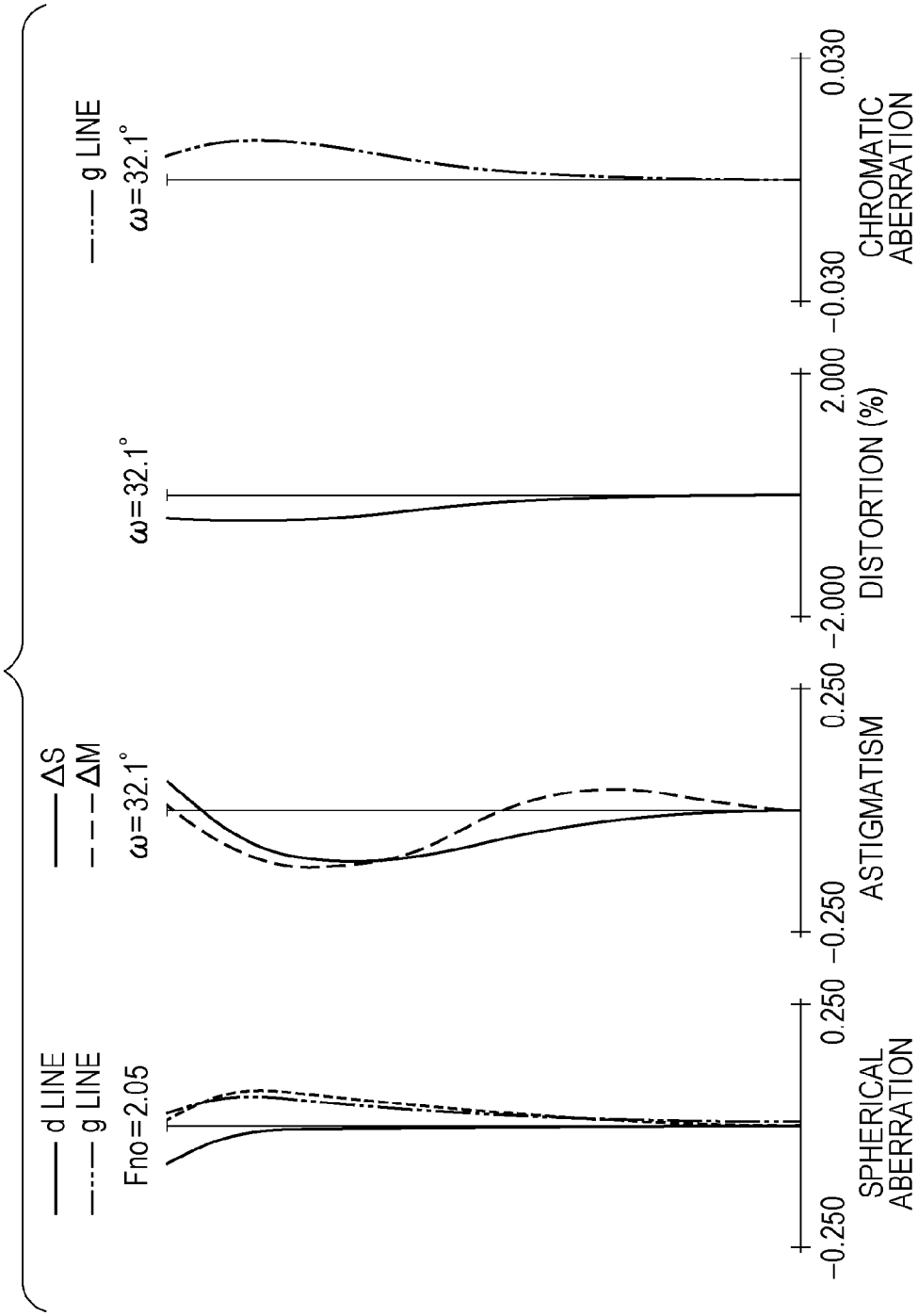

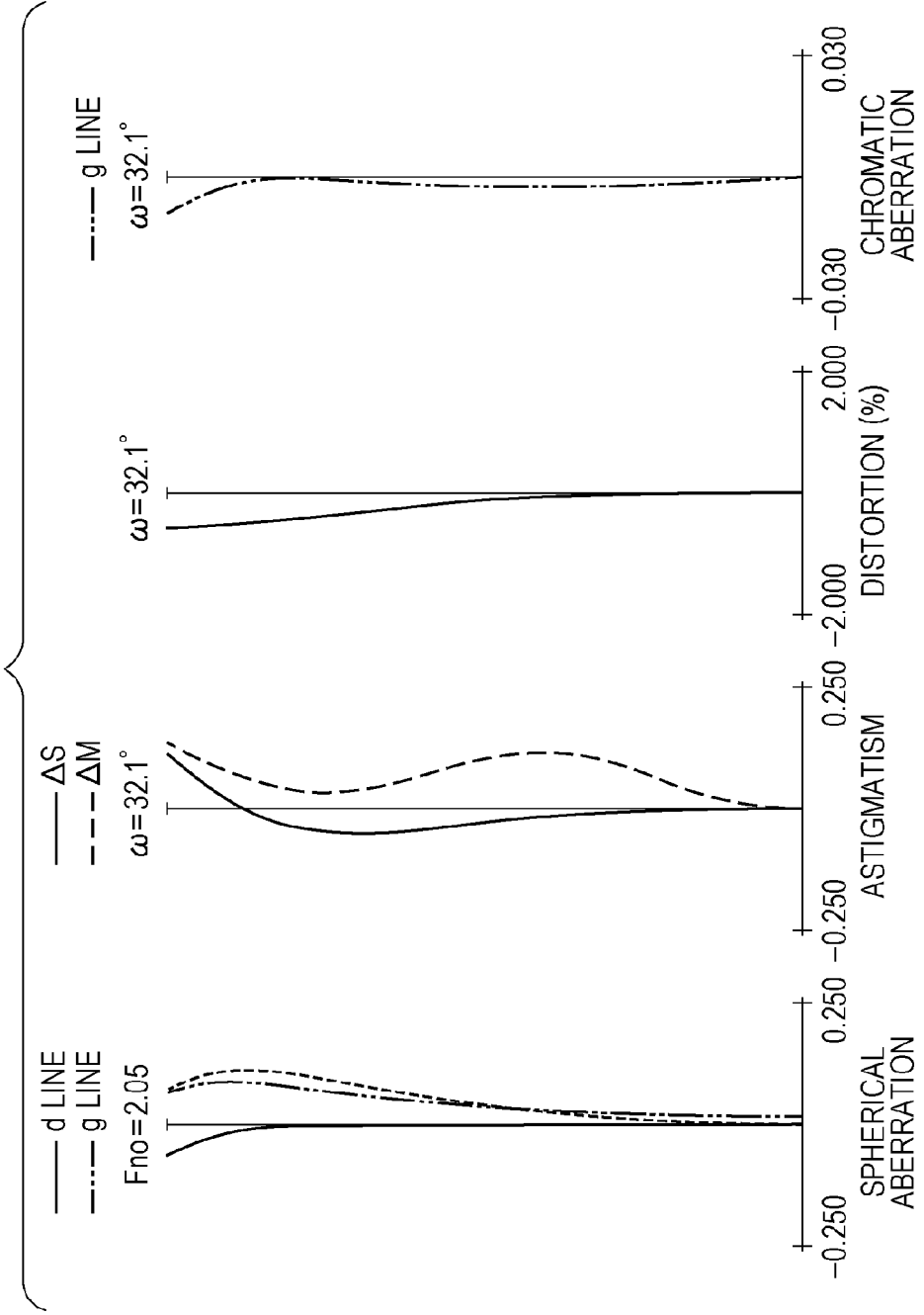

OPTICAL SYSTEM AND IMAGE PICKUP APPARATUS INCLUDING THE SAME

BACKGROUND OF THE INVENTION

1. Field of the Invention

The present invention relates to an optical system, and is suitable for an image pickup optical system used in an image pickup apparatus such as a silver halide film camera, a digital still camera, a digital video camera, a monitoring camera, or a broadcasting camera.

2. Description of the Related Art

Image pickup optical systems used in an image pickup apparatus, such as a digital still camera or a digital video camera, including a solid image pickup element are required to be small, have a wide view angle, etc. In addition, when the angle of incidence of a light ray that is incident upon the solid image pickup element is large, peripheral light quantity at a screen is reduced, as a result of which shading and color misregistration occur. Therefore, image pickup optical systems are required, for example, to have good telecentric property.

U.S. Pat. Nos. 7,440,196 and 7,940,478 each disclose an image pickup optical system in which an aperture stop is disposed closer to an object side than a central portion of the image pickup optical system, and the number of lenses of a lens unit that is disposed closer to the object side than the aperture stop is reduced, to reduce the size of an entire system.

An image pickup optical system in which a lens unit having a low positive refractive power is disposed in front of an aperture stop with the number of lenses being small and in which a lens unit having a relatively high positive refractive power is disposed behind the aperture stop easily achieves a wide view angle while ensuring back focus. However, with the aperture stop as a boundary, spherical aberration and asymmetric aberration (such as coma aberration) occur often when the asymmetry of a lens configuration at an object side and that at an image side are large.

In particular, if the F number of an image pickup optical system is reduced (that is, if the brightness is increased), spherical aberration occurs often, thereby making it difficult to achieve good optical performance.

An embodiment of the present invention provides an optical system which, while its entire system is small and while providing a wide view angle, can easily provide a high-quality image in the entire area of a screen, and can easily maintain good optical performance even during image stabilization.

SUMMARY OF THE INVENTION

According to an embodiment of the present invention, there is provided an optical system including a first lens unit, an aperture stop, and a second lens unit having a positive refractive power. The first lens unit, the aperture stop, and the second lens unit are disposed in that order from an object side to an image side. The first lens unit includes a first lens having a negative refractive power and a second lens having a positive refractive power in that order from the object side to the image side. The second lens unit includes a cemented lens, a fifth lens having a negative refractive power, and a sixth lens having a positive refractive power in that order from the object side to the image side, the cemented lens including a third lens having a positive refractive power and a fourth lens having a negative refractive power, the third lens and the fourth lens being cemented to each other, the fifth lens having a concave surface that faces the object side, the sixth lens having a convex surface that faces the image side. In the optical system, when a distance from an object-side lens surface vertex of the first lens to the aperture stop is D1 and a distance from the object-side lens surface vertex of the first lens to an image plane is Dt, the conditional expression $0.10 < D1/Dt < 0.25$ is satisfied.

Further features of the present invention will become apparent from the following description of exemplary embodiments with reference to the attached drawings.

BRIEF DESCRIPTION OF THE DRAWINGS

FIG. 1 is a sectional view of lenses when they are focused on an object at infinity in a first numerical example.

FIGS. 2A and 2B are graphs of longitudinal aberrations when the lenses are focused on the object at infinity and when the lenses are focused with a lateral magnification of $-0.1\times$ in the first numerical example.

FIG. 3 is a sectional view of lenses when they are focused on an object at infinity in a second numerical example.

FIGS. 4A and 4B are graphs of longitudinal aberrations when the lenses are focused on the object at infinity and when the lenses are focused with a lateral magnification of $-0.1\times$ in the second numerical example.

FIG. 5 is a sectional view of lenses when they are focused on an object at infinity in a third numerical example.

FIGS. 6A and 6B are graphs of longitudinal aberrations when the lenses are focused on the object at infinity and when the lenses are focused with a lateral magnification of $-0.1\times$ in the third numerical example.

FIG. 7 is a sectional view of lenses when they are focused on an object at infinity in a fourth numerical example.

FIGS. 8A and 8B are graphs of longitudinal aberrations when the lenses are focused on the object at infinity and when the lenses are focused with a lateral magnification of $-0.1\times$ in the fourth numerical example.

FIG. 9 is a sectional view of lenses when they are focused on an object at infinity in a fifth numerical example.

FIGS. 10A and 10B are graphs of longitudinal aberrations when the lenses are focused on the object at infinity and when the lenses are focused with a lateral magnification of $-0.1\times$ in the fifth numerical example.

DESCRIPTION OF THE EMBODIMENTS

Figure 11:
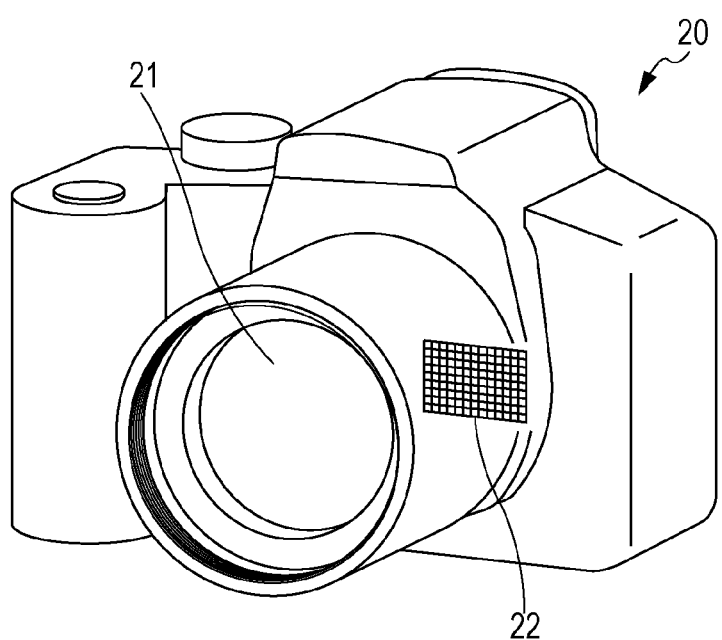
FIG. 11 is a schematic view of the main portion of an image pickup apparatus according to the present invention.

An optical system according to an embodiment of the present invention includes a first lens unit, an aperture stop, and a second lens unit having a positive refractive power in that order from an object side to an image side. The first lens unit includes a first lens having a negative refractive power and a second lens having a positive refractive power in that order from the object side to the image side. The second lens unit includes a cemented lens, a fifth lens, and a sixth lens in that order from the object side to the image side. In the cemented lens, a third lens having a positive refractive power and a fourth lens having a negative refractive power are cemented to each other. The fifth lens has a negative refractive power and has a concave surface that faces the object side. The sixth lens has a positive refractive power and has a convex surface that faces the image side.

In a desirable form, the optical system may further include a seventh lens at the image side of the sixth lens. The seventh lens has a positive refractive power and has an aspherical lens surface. Alternatively, when the sixth lens has an aspherical surface, the optical system may further include a seventh lens having a positive refractive power at the image side of the sixth lens.

FIG. 1 is a sectional view of lenses of an optical system according to a first embodiment of the present invention. FIGS. 2A and 2B are illustrations for when the optical system according to the first embodiment is focused on an object at infinity and for when the optical system according to the first embodiment is focused with a photographing magnification of −0.1×. FIG. 3 is a sectional view of lenses of an optical system according to a second embodiment of the present invention. FIGS. 4A and 4B are illustrations for when the optical system according to the second embodiment is focused on the object at infinity and when the optical system according to the second embodiment is focused with a photographing magnification of −0.1×. FIG. 5 is a sectional view of lenses of an optical system according to a third embodiment of the present invention. FIGS. 6A and 6B are illustrations for when the optical system according to the third embodiment is focused on the object at infinity and when the optical system according to the third embodiment is focused with a photographing magnification of −0.1×.

FIG. 7 is a sectional view of lenses of an optical system according to a fourth embodiment of the present invention. FIGS. 8A and 8B are illustrations for when the optical system according to the fourth embodiment is focused on the object at infinity and when the optical system according to the fourth embodiment is focused with a photographing magnification of −0.1×. FIG. 9 is a sectional view of lenses of an optical system according to a fifth embodiment of the present invention. FIGS. 10A and 10B are illustrations for when the optical system according to the fifth embodiment is focused on the object at infinity and when the optical system according to the fifth embodiment is focused with a photographing magnification of −0.1×. FIG. 11 is a schematic view of the main portion of a single lens reflex camera (image pickup apparatus) including the optical system according to an embodiment of the present invention.

The optical system according to each of the embodiments is an image pickup optical system used in an image pickup apparatus (optical apparatus), such as a digital still camera, a digital video camera, or a silver halide film camera. In the sectional views of the lenses, the left side corresponds to the object side (front side) and the right side corresponds to the image side (back side). The optical system according to each of the embodiments may be used as a projection lens of, for example, a projector. Here, the left side corresponds to the screen side and the right side corresponds to the side of an image to be projected.

In the sectional views of the lenses, LA denotes the optical system. The optical system LA includes a first lens unit L1 and a second lens unit L2 having a positive refractive power. The first lens unit L1 is disposed at the object side and the second lens unit L2 is disposed at the image side with an aperture stop SP being disposed therebetween. SP denotes the aperture stop. IP denotes an image plane, which corresponds to an image pickup plane of a solid image pickup element (photoelectric conversion element), such as a CCD sensor or a CMOS sensor, when the optical system is used as an image pickup optical system of, for example, a digital video camera or a digital still camera; and which corresponds to a film surface when the optical system is used as an image pickup optical system of a silver halide film camera.

The aberration diagrams illustrate spherical aberration, astigmatism, distortion, and chromatic aberration of magnification in that order from left to right. In each of the diagrams illustrating spherical aberration, the solid line represents a d line (587.6 nm), the alternate long and two short dash line represents a g line (435.8 nm), and the broken line represents a sine condition. In each of the diagrams illustrating astigmatism, the solid line represents a sagittal direction ΔS of the d line, and the broken line represents a meridional direction ΔM of the d line. Each of the diagrams illustrating distortion illustrates distortion at the d line. Chromatic aberration of magnification is for the g line with respect to the d line. Fno represents an F number, and ω represents a half field angle (degrees) of an image taking viewing angle.

Next, features of the optical system according to the present invention will be described. When, at a periphery of the screen, the angle of incidence of a light ray that is incident upon the solid image pickup element is large, peripheral light quantity at the screen is reduced, as a result of which shading and color misregistration tend to occur. Therefore, the optical system (image pickup optical system) for a digital camera is required to be one whose telecentric property at the image side is considered. To ensure telecentric property means to optically move an exit pupil position away from the image plane. In order to move the exit pupil position away from the image plane, it is effective to move the position of the aperture stop away from the image plane.

However, when the position of the aperture stop is moved away from the image plane, the overall lens length inevitably becomes large. Therefore, in order to ensure telecentric property while reducing the size of the optical system, it becomes important to suitably set the position of the aperture stop and form a lens configuration. In order to reduce the size of the optical system, it is effective to reduce the number of lenses. However, when the number of lenses is small, it becomes difficult to correct various aberrations, particularly, spherical aberration, axial chromatic aberration, and the Petzval sum.

More specifically, since the overall refractive power of the optical system is positive, spherical aberration tends to be overcorrected, and the Petzval sum tends to be positive, that is, the field curvature tends to be undercorrected. In order to reduce the size of an entire system and to achieve a large aperture, it is important to suitably dispose each lens of the optical system and to suitably set each lens shape.

In the optical system according to an embodiment of the present invention, when the position of the aperture stop is suitably set and the lenses are suitably disposed, satisfactory optical performance is achieved while increasing the aperture to approximately F2.0 while reducing the size of the entire system and providing telecentric property.

The optical system according to an embodiment of the present invention includes the first lens unit L1, the aperture stop SP, and the second lens unit L2 having a positive refractive power in that order from the object side to the image side. The first lens unit L1 includes a first lens L11 having a negative refractive power and a second lens L12 having a positive refractive power in that order from the object side to the image side. By disposing the first lens L11 having a negative refractive power at the object side, the angle between an off axis ray and the optical axis is reduced, so that the effective diameter of a front lens is reduced. When the first lens unit L1 includes two lenses, the size of the optical system is reduced while preventing the thickness of the first lens unit L1 from increasing and the effective diameter of the front lens from increasing.

When the distance from an object-side lens surface vertex of the first lens to the aperture stop is D1 and the distance from the object-side lens surface vertex of the first lens to the image plane is Dt, the following Conditional Expression (1) is satisfied:

$$0.10 < D1/Dt < 0.25 \quad (1)$$

where the signs of D1 and Dt are positive.

The entire system is reduced in size while ensuring telecentric property by disposing the aperture stop SP closer to the object side than a central position of the image pickup optical system. The Conditional Expression (1) defines where the aperture stop SP is disposed on the optical axis. If D1/Dt exceeds the upper limit of the Conditional Expression (1), the aperture stop SP is moved closer to the image plane, as a result of which the position of an exit pupil is moved closer to the image plane. This makes it difficult to ensure telecentric property. In addition, if D1/Dt exceeds the upper limit of the Conditional Expression (1), and the thickness of the first lens unit L1 is increased, the position of an entrance pupil is disposed away from a first lens surface of the optical system. Therefore, the effective diameter of the front lens is increased, as a result of which the size of the entire system is increased.

In contrast, if D1/Dt becomes less than the lower limit of the Conditional Expression (1), the thickness of the first lens unit L1 becomes too small. Therefore, it becomes difficult to ensure sufficient edge thickness and thickness of a central part, which are required for lens processing. Therefore, it is not desirable for D1/Dt to become less than the lower limit. It is more desirable to set the numerical range of the Conditional Expression (1) as follows:

$$0.15 < D1/Dt < 0.22 \quad (1a)$$

The configuration of the lenses of the second lens unit L2 of the optical system according to an embodiment of the present invention is as follows in the order of the lenses from the object side to the image side. The second lens unit L2 includes a cemented lens L21, a fifth lens L22, and a sixth lens L23. The cemented lens L21 includes a third lens L21p having a positive refractive power and a fourth lens L21n having a negative refractive power. The fifth lens L22 includes a concave surface facing the object side and has a negative refractive power. The sixth lens L23 includes a convex surface facing the image side and has a positive refractive power. The advantages of each of the lens elements will hereunder be described.

In general, the width of a light ray that passes through a lens near the aperture stop SP is such that the width of an on axis ray is large and the width of an off axis ray is small. Disposing the cemented lens L21 among the lenses of the second lens unit L2 closest to the aperture stop SP facilitates correction of axial chromatic aberration, which axial chromatic aberration becomes a problem when increasing the aperture. The fifth lens L22 whose concave surface faces the object side corrects spherical aberration and the Petzval sum occurring when the aperture is increased. When a concave surface having a high refractive power faces the object side, the angle of incidence of the off axis ray is set so as not to be made too large to the extent possible, so that an increase in off axis aberration is suppressed.

The sixth lens L21 having a positive refractive power makes it easier to provide telecentric property. When a convex surface having a high refractive power faces the image side, the angle of incidence of the off axis ray is set so as not to be made too large to the extent possible, so that an increase in off axis aberration is suppressed.

According to each of the embodiments, as described above, it is possible to provide an optical system which, while increasing the aperture to approximately F2.0, provides satisfactory optical performance, is small, is suitable for use in, for example, a digital camera, and has a wide view angle.

In each of the embodiments, it is desirable that at least one of the following various conditions be further satisfied, where the Abbe number of a material of the third lens L21p is vd21p, and the Abbe number of a material of the fourth lens L21n is vd21n.

The refractive index of a material of the fifth lens L22 is Nd22. The radius of curvature of an object-side lens surface of the fifth lens L22 is R221, and the focal length of the entire system is f. The distance from the object-side lens surface of the fifth lens L22 to the aperture stop SP is D2, where the sign of the distance D2 is positive. The focal length of the sixth lens L23 is f23. The focal length of the first lens L11 is f11. Here, it is desirable that at least one of the following Conditional expressions (2) to (7) be satisfied:

$$1.20 < vd21p/vd21n < 1.70 \quad (2)$$

$$1.50 < Nd22 < 1.73 \quad (3)$$

$$-0.50 < R221/f < -0.30 \quad (4)$$

$$-1.00 < R221/D2 < -0.60 \quad (5)$$

$$1.25 < f/f23 < 1.70 \quad (6)$$

$$-1.40 < f/f11 < -1.00 \quad (7)$$

Next, the technical meaning of each of the aforementioned conditional expressions will be described. The Conditional Expression (2) defines the ratio between the Abbe number of the material of the third lens L21p and the Abbe number of the material of the fourth lens L21n.

If the ratio becomes less than the lower limit of the Conditional Expression (2), axial aberration is undercorrected by the fourth lens L21n, and axial chromatic aberration at a short-wavelength side becomes too negative. Therefore, this is not desirable. If the Abbe number of the material of the fifth lens L22 is reduced for correcting axial chromatic aberration, chromatic aberration of magnification is overcorrected. Therefore, this is not desirable. In general, if a material having a small Abbe number is selected, the refractive index becomes large. Therefore, if the Abbe number of the material of the fifth lens L22 is reduced, the Petzval sum becomes too large in the positive direction, as a result of which image plane characteristics are deteriorated. Consequently, this is not desirable.

If the ratio becomes greater than the upper limit of the Conditional Expression (2), axial aberration is overcorrected by the fourth lens L21n and axial chromatic aberration at a short-wavelength side becomes too positive. Therefore, this is not desirable.

The Conditional Expression (3) defines the refractive index of the material of the fifth lens L22. The fifth lens L22 has a surface having a small absolute value of curvature for correcting spherical aberration. Therefore, the fifth lens L22 has a high refractive power. Consequently, selecting a material having a small refractive index for the fifth lens L22 facilitates correction of the Petzval sum. In general, a material having a low refractive index tends to have a large Abbe number. Therefore, if the refractive index of the material of the fifth lens L22 is reduced, axial chromatic aberration is undercorrected.

Thus, in each of the embodiments, when axial chromatic aberration is corrected by the cemented lens L21, spherical aberration, the Petzval sum, and axial chromatic aberration are all properly corrected.

If Nd22 becomes greater than the upper limit of the Conditional Expression (3) and the refractive index is increased, the value of the Petzval sum becomes too positive, as a result of which the field curvature is undercorrected. Therefore, this is not desirable. In contrast, if Nd22 becomes less than the lower limit of the Conditional Expression (3) and the refractive index is reduced, the value of the Petzval sum becomes too negative, as a result of which the field curvature is overcorrected. Therefore, this is not desirable.

The Conditional Expression (4) defines the relationship between the radius of curvature of the object-side lens surface of the fifth lens L22 and the focal length of the entire system. If R221/f becomes less than the lower limit of the Conditional Expression (4) and the value of the radius of curvature R221 is reduced, the absolute value of the radius of curvature becomes large, as a result of which spherical aberration is undercorrected. Therefore, this is not desirable. In contrast, if R221/f becomes greater than the upper limit of the Conditional Expression (4) and the value of the radius of curvature R221 becomes large, the absolute value of the radius of curvature becomes small, as a result of which spherical aberration is overcorrected. Therefore, this is not desirable.

The Conditional Expression (5) defines the relationship between the radius of curvature of the object-side lens surface of the fifth lens L22 and the aperture stop SP. In order to suppress off axis aberration that occurs at the object-side lens surface of the fifth lens L22, it is desirable that the aperture stop SP and the object-side lens surface of the fifth lens L22 be concentrically disposed.

That is, when the center of the radius of curvature of the object-side lens surface of the fifth lens L22 and the aperture stop SP are brought closer to each other, it is possible to reduce the angle between an off axis ray that is incident upon the object-side lens surface of the fifth lens L22 and a normal line to the object-side lens surface of the fifth lens L22. Therefore, it is possible to suppress off axis aberration that occurs at the object-side lens surface of the fifth lens L22.

If R221/D2 becomes greater than the upper limit of the Conditional Expression (5) and the aperture stop SP moves away from the object-side lens surface of the fifth lens L22, the angle between the off axis ray that is incident upon the object-side lens surface of the fifth lens L22 and the normal line to the object-side lens surface of the fifth lens L22 becomes large. As a result, it becomes difficult to correct various aberrations, in particular, distortion aberration and coma aberration. Therefore, this is not desirable. In contrast, if R221/D2 becomes less than the lower limit of the Conditional Expression (5) and the aperture stop SP is moved closer to the object-side lens surface of the fifth lens L22, off axis aberration is properly corrected. However, the incident height of an on axis ray that passes through the object-side lens surface of the fifth lens L22 becomes high, as a result of which spherical aberration is overcorrected. Therefore, this is not desirable.

The Conditional Expression (6) defines the refractive power of the sixth lens L23. If f/f23 becomes greater than the upper limit of the Conditional Expression (6) and the refractive power of the sixth lens L23 becomes large, telecentric property is good. However, various aberrations, in particular, barrel distortion aberration is increased. In contrast, if f/f23 becomes less than the lower limit of the Conditional Expression (6) and the refractive power of the sixth lens L23 becomes small, the telecentric property is deteriorated. Therefore, this is not desirable.

In general, in a lens having a wide view angle, the correction of off axis aberration becomes important. It is known that reducing the angle between an off axis ray and an optical axis by disposing a negative lens at the object side facilitates the correction of off axis aberration. However, if a negative lens is disposed, the off axis ray diverges and spreads, as a result of which axial aberrations, in particular, spherical aberration, are not properly corrected.

Therefore, in each of the embodiments, a negative lens is disposed closest to the object side, and its refractive power is properly set, to achieve a wide field angle and a large aperture.

The Conditional Expression (7) defines the ratio between the focal length of the first lens L11 and the focal length of the entire system. If f/f11 becomes greater than the upper limit of the Conditional Expression (7) and the negative refractive power of the first lens L11 is reduced, it becomes difficult to correct off axis aberrations, in particular, astigmatism. Therefore, this is not desirable. In contrast, if f/f11 becomes less than the lower limit of the Conditional Expression (7) and the negative refractive power of the first lens L11 is increased, it becomes difficult to correct axial aberrations, in particular, spherical aberration. Therefore, this is not desirable. It is more desirable to set the numerical ranges of the Conditional expressions (2) to (7) as follows:

$$1.35 < \nu d21p/\nu d21n < 1.61 \quad (2a)$$

$$1.56 < Nd22 < 1.70 \quad (3a)$$

$$-0.42 < R221/f < -0.37 \quad (4a)$$

$$-0.91 < R221/D2 < -0.71 \quad (5a)$$

$$1.30 < f/f23 < 1.60 \quad (6a)$$

$$-1.37 < f/f11 < -1.10 \quad (7a)$$

A specific lens configuration according to each of the embodiments is as follows. The first lens unit L1 includes a first lens L11 and a second lens L12 in that order from the object side to the image side. Both surfaces of the first lens L11 have concave shapes. Both surfaces of the second lens L12 have convex shapes.

The second lens unit L2 includes a cemented lens and a fifth lens L22 having a negative refractive power. In the cemented lens, a third lens L21p and a fourth lens L21n are cemented to each other. Both lens surfaces of the third lens L21p have convex shapes. Both lens surfaces of the fourth lens L21n have concave shapes. The object side of the fifth lens L22 has a concave shape. The second lens unit L2 further includes a sixth lens L23 and a seventh lens L24 having a positive refractive power. Both lens surfaces of the sixth lens L23 have convex shapes. The seventh lens L24 includes an image-side lens surface having a convex shape.

In each of the embodiments, it is desirable that the second lens unit L2 include an aspherical seventh lens L24 disposed at the image side of the sixth lens L23. The positive refractive power of the seventh lens L24 becomes smaller from the center of the lens towards an edge of the lens.

According to this lens configuration, it is possible to easily correct asymmetric aberrations, in particular, distortion aberration and coma aberration, which occur because the aperture stop SP is disposed at the front side. When focusing the optical system from an object at infinity to a nearby object, it is desirable that an air gap between the first lens unit L1 and the second lens unit L2 be small. More specifically, it is desirable to move both of these lens units L1 and L2 towards the object with the gap between both of these lens units L1 and L2 being small.

The optical system according to an embodiment of the present invention includes a system for moving all of the lenses or some of the lens units in an optical axis direction for focusing on a nearby object. When focusing from an object at infinity to a nearby object, if the air gap of the first lens unit L1 and that of the second lens unit L2 are small, aberration variations (in particular, variation in field curvature) occurring when focusing on a nearby object are easily suppressed. In each of the embodiments, when focusing, the aperture stop SP is moved together with the first lens unit L1. Alternatively, when focusing, the aperture stop SP may be moved together with the second lens unit L2, or the aperture stop SP may be moved separately from the first lens unit L1 and the second lens unit L2.

FIG. 11 is a schematic view of the main portion of a digital still camera using the optical system according to any one of the embodiments. In FIG. 11, reference numeral 20 denotes a camera body, and reference numeral 21 denotes an image pickup optical system corresponding to the optical system described in any one of the embodiments. Reference numeral 22 denotes a solid image pickup element (photoelectric conversion element), such as a CCD sensor or a CMOS sensor, that receives light of an object image formed by the image pickup optical system 21.

The optical system according to each embodiment is applicable to a single lens reflex camera that includes a quick return mirror or to a mirrorless single lens reflex camera that does not include a quick return mirror.

Next, first to fifth numerical examples corresponding to the first to fifth embodiments according to the present invention will be described. In the numerical embodiments, a surface number i represents the order of a surface from the object side, ri represents the radius of curvature of an ith surface in order of surfaces from the object side, and di represents an air gap or a lens thickness between the ith surface and an (i+1)th surface in the order of surfaces from the object side. ndi and vdi represent the refractive index and the Abbe number, respectively, at a d line of a material of an ith optical member in order of optical members from the object side. An aspherical shape is defined by the following Formula (I):

$$X = \frac{(1/R)}{1 + \sqrt{1 - (1+K)(H/R)^2}} + A_4 H^4 + A_6 H^6 + A_8 H^8 + A_{10} H^{10} + A_{12} H^{12} \quad (1)$$

where an X axis extends along the optical axis, an H axis extends along a direction perpendicular to the optical axis, the direction of propagation of light is positive, R represents the paraxial radius of curvature, and K, A4, A6, A8, A10, and A12 represent aspherical coefficients. e-0X represents $10^{-x}$. The air gap that changes as focusing is performed is variable, and is one when an object at infinity is focused and one when an object is focused with an imaging lateral magnification of −0.1x. Table 1 gives the relationship between the aforementioned conditional expressions and the numerical embodiments.

FIRST NUMERICAL EXAMPLE

Surface Data

| Surface No. | r | d | nd | vd |
|---|---|---|---|---|
| 1 | −30.023 | 0.70 | 1.51742 | 52.4 |
| 2 | 12.543 | 0.93 | | |
| 3 | 14.331 | 3.26 | 1.83481 | 42.7 |
| 4 | −61.934 | 1.94 | | |
| 5 (stop) | ∞ | (variable) | | |
| 6 | 19.402 | 3.98 | 1.88300 | 40.8 |
| 7 | −10.941 | 0.80 | 1.78472 | 25.7 |
| 8 | 19.741 | 3.26 | | |
| 9 | −8.483 | 0.80 | 1.62588 | 35.7 |
| 10 | −247.157 | 0.25 | | |
| 11 | 59.414 | 5.60 | 1.88300 | 40.8 |
| 12 | −15.716 | 0.15 | | |
| 13* | −65.386 | 2.32 | 1.58313 | 59.4 |
| 14* | −26.414 | (variable) | | |
| Image Plane | ∞ | | | |

Aspherical Surface Data

13th Surface

K = 0.00000e+000 A4 = −1.06417e−004 A6 = −2.68284e−007
A8 = −5.69512e−009 A10 = −5.83577e−014 A12 = −4.69051e−014

14th Surface

K = 0.00000e+000 A4 = 6.63637e−006 A6 = −1.81488e−007
A8 = −8.38345e−010 A10 = −2.73326e−012 A12 = 3.03992e−014

| | | |
|---|---|---|
| Focal Length | | 21.78 |
| F Number | | 2.05 |
| Half Field Angle | | 32.09 (degrees) |
| Image Height | | 13.66 |
| Infinity | | −0.1x |
| d5 | 3.14 | 2.25 |
| d14 | 14.20 | 16.47 |

SECOND NUMERICAL EXAMPLE

Surface Data

| Surface No. | r | d | nd | vd |
|---|---|---|---|---|
| 1 | −28.881 | 0.70 | 1.51823 | 58.9 |
| 2 | 12.313 | 0.78 | | |
| 3 | 13.825 | 3.25 | 1.83481 | 42.7 |
| 4 | −58.088 | 1.65 | | |
| 5 (stop) | ∞ | (variable) | | |
| 6 | 20.594 | 4.41 | 1.88300 | 40.8 |
| 7 | −9.942 | 0.80 | 1.80518 | 25.4 |
| 8 | 20.069 | 2.96 | | |
| 9 | −8.784 | 0.80 | 1.66998 | 39.3 |
| 10 | 701.578 | 0.15 | | |
| 11* | 61.475 | 4.24 | 1.85400 | 40.4 |
| 12* | −15.596 | 0.67 | | |
| 13 | −35.845 | 3.22 | 1.69680 | 55.5 |
| 14* | −17.448 | (variable) | | |
| Image Plane | ∞ | | | |

Aspherical Surface Data

11th Surface

K = 0.00000e+000 A4 = 3.61389e−006 A6 = 4.95728e−007
A8 = 1.60799e−009

12th Surface

K = 0.00000e+000 A4 = 8.80314e−005 A6 = 5.29549e−007
A8 = 8.10108e−009

| | | |
|---|---|---|
| Focal Length | | 22.50 |
| F Number | | 2.05 |
| Half Field Angle | | 31.26 (degrees) |
| Image Height | | 13.66 |
| Infinity | | −0.1x |
| d5 | 1.60 | 1.07 |
| d14 | 15.72 | 18.05 |

THIRD NUMERICAL EXAMPLE

Surface Data

| Surface No. | r | d | nd | vd |
|---|---|---|---|---|
| 1 | −33.227 | 0.70 | 1.51742 | 52.4 |
| 2 | 12.076 | 1.46 | | |
| 3 | 14.691 | 3.95 | 1.83481 | 42.7 |
| 4 | −62.386 | 2.95 | | |
| 5 (stop) | ∞ | (variable) | | |
| 6 | 20.852 | 4.88 | 1.88300 | 40.8 |
| 7 | −8.162 | 0.80 | 1.78470 | 26.3 |
| 8 | 21.452 | 3.02 | | |
| 9 | −7.600 | 0.80 | 1.60342 | 38.0 |
| 10 | −129.698 | 0.25 | | |
| 11 | 54.254 | 5.34 | 1.88300 | 40.8 |
| 12 | −16.889 | 0.57 | | |
| 13* | −125.979 | 2.46 | 1.58313 | 59.4 |
| 14* | −22.664 | (variable) | | |
| Image Plane | ∞ | | | |

Aspherical Surface Data

13th Surface $K = 0.00000e+000 \; A4 = -8.95334e-005 \; A6 = -3.30014e-007$
$A8 = -6.38181e-009 \; A10 = -7.20222e-014 \; A12 = -1.49295e-013$

14th Surface $K = 0.00000e+000 \; A4 = 4.67959e-005 \; A6 = -3.01129e-007$
$A8 = -1.33569e-009 \; A10 = -9.23216e-012 \; A12 = 3.68884e-014$

| | | |
|---|---|---|
| Focal Length | 20.00 | |
| F Number | 2.30 | |
| Half Field Angle | 34.33 (degrees) | |
| Image Height | 13.66 | |
| Infinity | | −0.1x |
| d5 | 1.79 | 0.97 |
| d14 | 12.49 | 14.56 |

FOURTH NUMERICAL EXAMPLE

Surface Data

| Surface No. | r | d | nd | vd |
|---|---|---|---|---|
| 1 | −36.727 | 0.70 | 1.51742 | 52.4 |
| 2 | 13.436 | 0.75 | | |
| 3 | 15.011 | 3.47 | 1.83481 | 42.7 |
| 4 | −94.930 | 2.78 | | |
| 5 (stop) | ∞ | (variable) | | |
| 6 | 19.386 | 4.76 | 1.88300 | 40.8 |
| 7 | −11.085 | 0.80 | 1.80518 | 25.4 |
| 8 | 21.320 | 3.52 | | |
| 9 | −9.401 | 0.80 | 1.57501 | 41.5 |
| 10 | 101.860 | 0.25 | | |
| 11 | 45.880 | 5.45 | 1.88300 | 40.8 |
| 12 | −17.606 | 1.53 | | |
| 13* | 452.112 | 3.57 | 1.58313 | 59.4 |
| 14* | −60.013 | (variable) | | |
| Image Plane | ∞ | | | |

Aspherical Surface Data

13th Surface $K = 0.00000e+000 \; A4 = -1.12157e-004 \; A6 = -8.38411e-007$
$A8 = -2.87693e-009 \; A10 = -5.11562e-011 \; A12 = 2.74733e-013$

14th Surface $K = 0.00000e+000 \; A4 = -1.69977e-005 \; A6 = -6.43681e-007$
$A8 = -2.41312e-009 \; A10 = 2.73124e-011 \; A12 = -4.11866e-014$

| | | |
|---|---|---|
| Focal Length | 24.00 | |
| F Number | 2.00 | |
| Half Field Angle | 29.65 (degrees) | |
| Image Height | 13.66 | |
| Infinity | | −0.1x |
| d5 | 2.82 | 1.85 |
| d14 | 12.49 | 14.97 |

FIFTH NUMERICAL EXAMPLE

Surface Data

| Surface No. | r | d | nd | vd |
|---|---|---|---|---|
| 1 | −32.349 | 0.70 | 1.54072 | 47.2 |
| 2 | 12.824 | 0.74 | | |
| 3 | 14.509 | 3.23 | 1.83481 | 42.7 |
| 4 | −61.041 | 2.34 | | |
| 5 (stop) | ∞ | (variable) | | |
| 6 | 19.039 | 4.51 | 1.88300 | 40.8 |
| 7 | −9.150 | 0.80 | 1.80000 | 29.8 |
| 8 | 21.457 | 2.81 | | |
| 9 | −8.943 | 0.80 | 1.69895 | 30.1 |
| 10 | 392.242 | 0.25 | | |
| 11 | 64.175 | 5.64 | 1.88300 | 40.8 |
| 12 | −15.386 | 0.15 | | |
| 13* | 522.487 | 2.31 | 1.67790 | 54.9 |
| 14* | −42.132 | (variable) | | |
| Image Plane | ∞ | | | |

Aspherical Surface Data

13th Surface $K = 0.00000e+000 \; A4 = -6.04522e-005 \; A6 = -9.02142e-007$
$A8 = -6.96193e-009 \; A10 = -2.09444e-012 \; A12 = -1.97549e-013$

14th Surface $K = 0.00000e+000 \; A4 = 2.59992e-005 \; A6 = -8.76082e-007$
$A8 = -2.47619e-009 \; A10 = -7.12892e-012 \; A12 = 1.25532e-013$

| | | |
|---|---|---|
| Focal Length | 21.74 | |
| F Number | 2.05 | |
| Half Field Angle | 32.14 (degrees) | |
| Image Height | 13.66 | |
| Infinity | | −0.1x |
| d5 | 2.73 | 1.85 |
| d14 | 14.44 | 16.68 |

TABLE 1

| Conditional Expression | First Numerical Example | Second Numerical Example | Third Numerical Example | Fourth Numerical Example | Fifth Numerical Example |
|---|---|---|---|---|---|
| (1) D1/Dt | 0.166 | 0.156 | 0.219 | 0.176 | 0.169 |
| (2) vd21p/vd21n | 1.587 | 1.603 | 1.550 | 1.603 | 1.366 |
| (3) Nd22 | 1.626 | 1.670 | 1.603 | 1.575 | 1.699 |
| (4) R221/f | −0.389 | −0.390 | −0.380 | −0.392 | −0.411 |
| (5) R221/D2 | −0.760 | −0.899 | −0.725 | −0.790 | −0.825 |
| (6) f/f23 | 1.493 | 1.505 | 1.323 | 1.599 | 1.495 |
| (7) f/f11 | −1.281 | −1.358 | −1.175 | −1.268 | −1.287 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-058491, filed Mar. 15, 2012, which is hereby incorporated by reference herein in its entirety.

What is claimed is:

1. An optical system comprising:
a first lens unit;
an aperture stop; and
a second lens unit having a positive refractive power,
wherein the first lens unit, the aperture stop, and the second lens unit are disposed in that order from an object side to an image side,
wherein the first lens unit includes a first lens having a negative refractive power and a second lens having a positive refractive power in that order from the object side to the image side,
wherein the second lens unit includes a cemented lens, a fifth lens having a negative refractive power, and a sixth lens having a positive refractive power in that order from the object side to the image side, the cemented lens including a third lens having a positive refractive power and a fourth lens having a negative refractive power, the third lens and the fourth lens being cemented to each other, the fifth lens having a concave surface that faces the object side, the sixth lens having a convex surface that faces the image side, and
wherein when a distance from an object-side lens surface vertex of the first lens to the aperture stop is D1 and a distance from the object-side lens surface vertex of the first lens to an image plane is Dt, the conditional expression 0.10<D1/Dt<0.25 is satisfied.

2. The optical system according to claim 1, wherein when an Abbe number of a material of the third lens is vd21$p$ and an Abbe number of a material of the fourth lens is vd21$n$, the conditional expression 1.20<vd21$p$/vd21$n$<1.70 is satisfied.

3. The optical system according to claim 1, wherein when Nd22 is a refractive index of a material of the fifth lens, the conditional expression 1.50<Nd22<1.73 is satisfied.

4. The optical system according to claim 1, wherein when a radius of curvature of an object-side lens surface of the fifth lens is R221 and a focal length of an entire system is f, the conditional expression −0.50<R221/f<−0.30 is satisfied.

5. The optical system according to claim 1, further comprising a seventh lens disposed at the image side of the sixth lens, wherein the seventh lens includes an aspherical lens surface whose positive refractive power is reduced from a center of the seventh lens towards an edge of the seventh lens.

6. The optical system according to claim 1, wherein when a radius of curvature of an object-side lens surface of the fifth lens is R221 and a distance from the object-side lens surface of the fifth lens to the aperture stop is D2, the conditional expression −1.00<R221/D2<−0.60 is satisfied.

7. The optical system according to claim 1, wherein when a focal length of the sixth lens is f23 and a focal length of an entire system is f, the conditional expression 1.25<f/f23<1.70 is satisfied.

8. The optical system according to claim 1, wherein when focusing from an object at infinity to a nearby object, an air gap between the first lens unit and the second lens unit is made smaller.

9. The optical system according to claim 1, wherein when a focal length of the first lens is f11 and a focal length of an entire system is f, the conditional expression −1.40<f/f11<−1.00 is satisfied.

10. The optical system according to claim 1, wherein the first lens unit includes the first lens and the second lens in that order from the object side to the image side, both lens surfaces of the first lens having concave shapes, both lens surfaces of the second lens having convex shapes, and
wherein the second lens unit includes the cemented lens, the fifth lens having a negative refractive power, the sixth lens, and a seventh lens having a positive refractive power in that order from the object side to the image side, the cemented lens including the third lens and the fourth lens that are cemented to each other, both lens surfaces of the third lens having convex shapes, both lens surfaces of the fourth lens having concave shapes, an object side of the fifth lens having a concave shape, both lens surfaces of the sixth lens having convex shapes, an image-side lens surface of the seventh lens having a convex shape.

11. An image pickup apparatus comprising:
the optical system according to claim 1.

* * * * *